US012463896B2

(12) United States Patent
Mereddy (10) Patent No.: US 12,463,896 B2
(45) Date of Patent: Nov. 4, 2025

(54) EXTERNAL BORDER GATEWAY PROTOCOL PEER ANALYSIS

(71) Applicant: Charter Communications Operating, LLC, St. Louis, MO (US)

(72) Inventor: Sandeep Reddy Mereddy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 750 days.

(21) Appl. No.: 17/079,201

(22) Filed: Oct. 23, 2020

(65) Prior Publication Data

US 2022/0131785 A1 Apr. 28, 2022

(51) Int. Cl.
| | |
|---|---|
| H04L 29/02 | (2006.01) |
| H04L 41/12 | (2022.01) |
| H04L 41/16 | (2022.01) |
| H04L 41/22 | (2022.01) |
| H04L 45/02 | (2022.01) |
| H04L 45/033 | (2022.01) |
| H04L 45/58 | (2022.01) |

(52) U.S. Cl.
CPC .............. *H04L 45/58* (2013.01); *H04L 41/12* (2013.01); *H04L 41/16* (2013.01); *H04L 41/22* (2013.01); *H04L 45/033* (2022.05); *H04L 45/04* (2013.01)

(58) Field of Classification Search
CPC ......... H04L 41/14; H04L 41/16; H04L 41/22; H04L 45/02; H04L 45/58; H04L 45/04
See application file for complete search history.

(56) References Cited

U.S. PATENT DOCUMENTS

| | | | |
|---|---|---|---|
| 9,729,414 B1 * | 8/2017 | Oliveira | ................ H04L 43/062 |
| 10,630,582 B1 * | 4/2020 | Deb | ........................ H04L 45/04 |
| 2015/0256455 A1 * | 9/2015 | Suzuki | .................... H04L 45/04 |
| | | | 370/392 |
| 2019/0187652 A1 * | 6/2019 | Cella | ...................... H04W 84/18 |
| 2021/0135968 A1 * | 5/2021 | Oswald | ................. G06F 16/221 |
| 2021/0144087 A1 * | 5/2021 | Tandon | ............... H04L 12/4641 |

* cited by examiner

*Primary Examiner* — Adnan M Mirza
(74) *Attorney, Agent, or Firm* — Dority & Manning, P.A.

(57) ABSTRACT

External border gateway protocol peer analysis is disclosed. For each of a plurality of external border gateway protocol (EBGP) routers in a first autonomous system (AS), corresponding EBGP peer information about at least one EBGP peer router of the respective EBGP router is obtained. User interface imagery that comprises a plurality of EBGP router controls, each EBGP router control corresponding to one of the plurality of EBGP routers, is presented on a display device. A router selection input that identifies a first EBGP router control of the plurality of EBGP router controls is received, the first EBGP router control corresponding to a first EBGP router of the plurality of EBGP routers. In response to receiving the router selection input, user interface imagery that identifies the at least one EBGP peer router of the first EBGP router is presented on the display device.

21 Claims, 7 Drawing Sheets

EXTERNAL BORDER GATEWAY PROTOCOL PEER ANALYSIS

BACKGROUND

The embodiments relate to analysis of external border gateway protocol peers.

SUMMARY

The embodiments disclosed herein implement intuitive analysis and presentation of external border gateway protocol (EBGP) peer information.

In one embodiment a method is provided. The method includes obtaining, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS. The method further includes presenting, on a display device, user interface imagery that comprises a plurality of EBGP router controls, each EBGP router control corresponding to one of the plurality of EBGP routers. The method further includes receiving a router selection input that identifies a first EBGP router control of the plurality of EBGP router controls, the first EBGP router control corresponding to a first EBGP router of the plurality of EBGP routers. The method further includes, in response to receiving the router selection input, presenting, on the display device, user interface imagery that identifies the at least one EBGP peer router of the first EBGP router.

In another embodiment a computing device is provided. The computing device includes a memory and a processor device coupled to the memory. The processor device is further configured to obtain, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS. The processor device is further configured to present, on a display device, user interface imagery that comprises a plurality of EBGP router controls, each EBGP router control corresponding to one of the plurality of EBGP routers. The processor device is further configured to receive a router selection input that identifies a first EBGP router control of the plurality of EBGP router controls, the first router control corresponding to a first EBGP router of the plurality of EBGP routers. The processor device is further configured to, in response to receiving the router selection input, present, on the display device, user interface imagery that identifies the at least one EBGP peer router of the first EBGP router.

In another embodiment a non-transitory computer-readable storage medium is provided. The non-transitory computer-readable storage medium includes executable instructions configured to cause a processor device to obtain, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS. The executable instructions are further configured to cause the processor device to present, on a display device, user interface imagery that comprises a plurality of EBGP router controls, each EBGP router control corresponding to one of the plurality of EBGP routers. The executable instructions are further configured to cause the processor device to receive a router selection input that identifies a first EBGP router control of the plurality of EBGP router controls, the first EBGP router control corresponding to a first EBGP router of the plurality of EBGP routers. The executable instructions are further configured to cause the processor device to, in response to receiving the router selection input, present, on the display device, user interface imagery that identifies the at least one EBGP peer router of the first EBGP router.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or"

as used herein and in the claims is inclusive unless contextually impossible. As an example, the recitation of A or B means A, or B, or both A and B.

An autonomous system (AS), as used herein, refers to a network that has been assigned a unique autonomous system number, typically by a regional internet registry such as the American Registry for Internet Numbers (ARIN). Autonomous systems connect to other autonomous systems at internet exchange points. The interconnections between autonomous systems allow computing devices all over the world to communicate with one another.

A router in a first AS communicates to a router in a second AS via an external border gateway protocol (EBGP). The two routers establish an EBGP peering session, and are referred to as peers of one another. The first router may establish EBGP peering sessions with any number of routers in different autonomous systems, such as tens, hundreds or even thousands of different routers. Each router in an EBGP peering session has an internet protocol (IP) address on the same subnet to facilitate packet routing. For purposes of simplicity, a router that has an EBGP peering session with another router may be referred to herein as an EBGP router. It is noted that an EBGP router that has a EBGP peering session with another router in another AS likely also has border gateway protocol (BGP) sessions with other routers that are in the same AS as the EBGP router in order to facilitate routing within the AS.

An EBGP router announces to its peers "prefixes" which identify IPv4 or IPv6 address blocks to which the EBGP router can route packets. In this manner, an EBGP router can receive a packet, examine the prefixes to which its peers can route packets, select a peer capable of moving the packet toward the destination IP address, and provide the packet to the peer for subsequent transmission along the path toward the destination.

Unfortunately, EBGP routers can be misconfigured which can cause erroneous prefixes to be announced, which can result in outages for affected network address blocks. Moreover, from time-to-time an EBGP router may flood its peers with an unexpected number of prefixes. Sometimes a flood of prefixes is due to a hijack attack, and the prefixes may be prefixes that the EBGP router does not own, thereby causing traffic destined to such prefixes to become undeliverable. Moreover, EBGP routers typically have a finite amount of memory, and thus a flood of prefixes may cause a memory crash in an EBGP router that is the recipient of the flood of prefixes.

The embodiments disclosed herein implement intuitive analysis and presentation of EBGP peer information. In particular, EGBP peer information is obtained from each of a plurality of EBGP routers in an AS. Upon request, EBGP controls that correspond to the EBGP routers in the AS are presented on a display device. An operator may select an EBGP router control, and the EBGP peers of the EBGP router that corresponds to the EBGP router control are identified. Any particular EBGP peer may be selected, and a graph, illustrating actual active prefixes received from the EBGP peer over a period of time, predicted active prefixes based on a machine-learned model, and a prediction of future active prefixes for a subsequent period of time, is presented. The embodiments implement a highly intuitive mechanism for analyzing the EBGP routers in an AS, the peers of such EBGP routers, and problems, or imminent problems, associated with announced prefixes.

Figure 1:
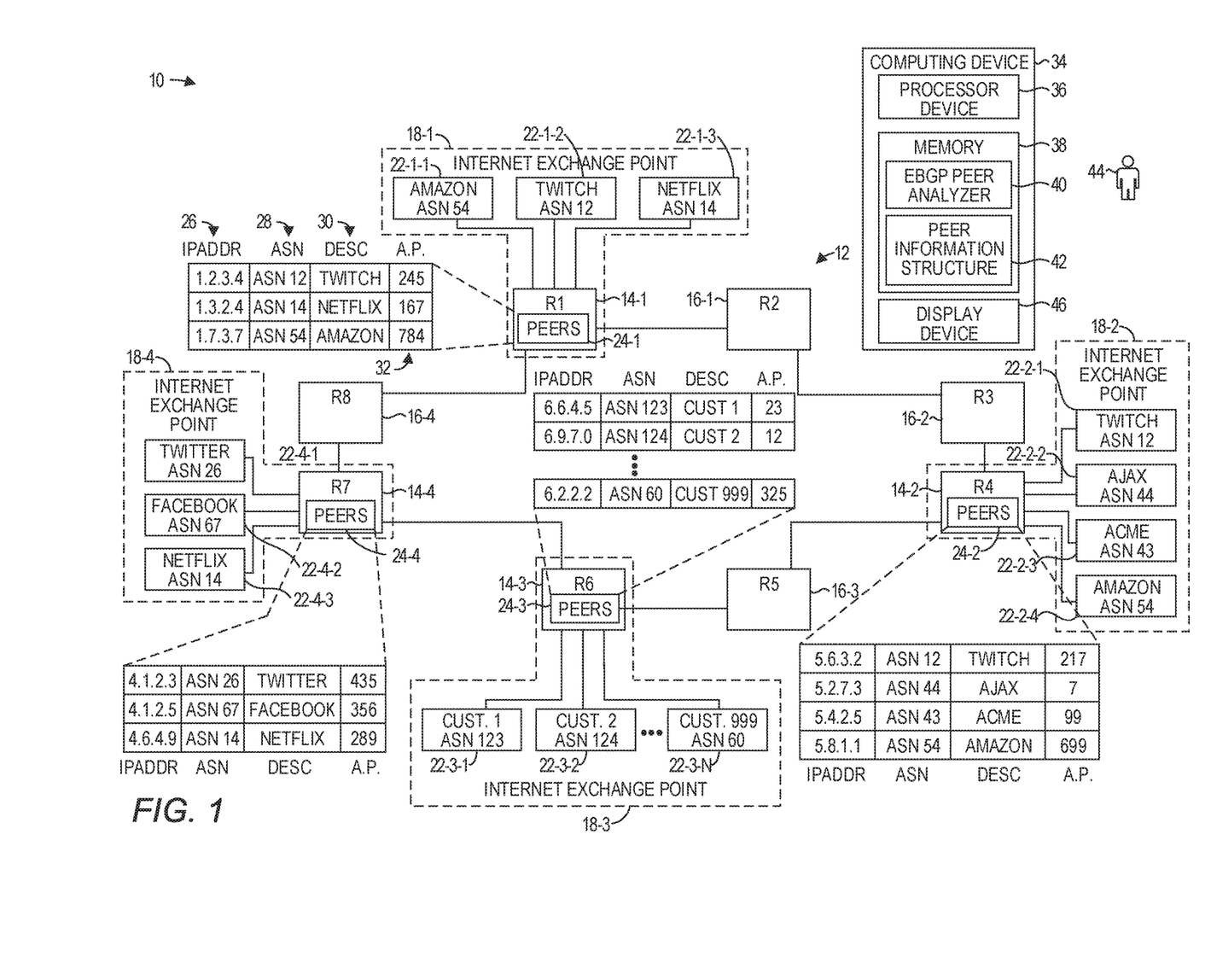
FIG. 1 is a block diagram illustrating an environment in which various embodiments may be practiced.

FIG. 1 is a block diagram illustrating an environment 10 in which embodiments may be practiced. The environment 10 includes an AS 12 that comprises a plurality of EBGP routers 14-1-14-4 (generally, EBGP routers 14) and routers 16-1-16-4 (generally, routers 16). The EBGP routers 14 differ from the routers 16 solely in that the EBGP routers 14, in addition to executing BGP, also execute EBGP with peer EBGP routers at Internet Exchange Points (IEPs) 18-1-18-4 (generally, IEPs 18). The EBGP routers 14 and routers 16 each utilize the same ASN and are part of the same AS. The EBGP routers 14-1-14-4 may be, geographically, hundreds or thousands of miles apart from one another and service different areas of a country, or service different segments of business. While for purposes of simplicity only four EBGP routers 14 are illustrated, in practice, in a large service provider's network, there could be hundreds of EBGP routers 14. The illustrated connections between the EBGP routers 14 and routers 16 may form, for example, a backbone of a much larger network that comprises thousands or tens of thousands of routers via additional connections (not shown) between the EBGP routers 14 and routers 16 and additional routers in the AS 12.

Each EBGP router 14 maintains an EBGP session to one or more EBGP peer routers at an IEP 18. The EBGP router 14-1 maintains an EBGP session with EBGP peer routers 22-1-1-22-1-3 at the IEP 18-1. Each of the EBGP peer routers 22-1-22-3 may be directly communicatively coupled to the EBGP router 14-1 via a separate network interface and a separate communications medium, such as via a separate fiber or wire. The EBGP peer routers 22-1-1-22-1-3 are EBGP routers associated with other ASs. In this example, the EBGP peer router 22-1-1 is associated with an AS having the ASN 54; the EBGP peer router 22-1-2 is associated with an AS having the ASN 12, and the EBGP peer router 22-1-3 is associated with an AS having the ASN 14. The EBGP router 14-1 is on a first subnet with the EBGP peer router 22-1-1, a second subnet with the EBGP peer router 22-1-2, and a third subnet with the EBGP peer router 22-1-3. While for purposes of illustration the EBGP router 14-1 is illustrated as having EBGP sessions with three EBGP peer routers 22-1-1-22-1-3, in practice, in an AS of a large service provider for example, each EBGP router 14 could have EBGP sessions with hundreds of EBGP peer routers, each associated with a different AS. It is noted that the ASNs depicted herein are fictional and likely not those actually associated with the identified ASs, in this example, Amazon, Twitch®, and Netflix®.

The EBGP router 14-1 maintains configuration information, including peer information 24-1, that contains information about each EBGP peer router 22-1-1-22-1-3 with which the EBGP router 14-1 has an EBGP session. The peer information 24-1 includes, for example, for each EBGP peer router 22-1-1-22-1-3, an IP address field 26 that contains the IP address of the EBGP peer router 22-1-1-22-1-3, an ASN field 28 that contains the ASN of the EBGP peer router 22-1-1-22-1-3, a descriptive name field 30 that contains a descriptive name for each EBGP peer router 22-1-1-22-1-3, and a current number of active prefixes field 32 that contains the current number of active prefixes to which the EBGP peer router 22-1-1-22-1-3 can route packets. The EBGP router 14-1 is on a same subnet as each of the EBGP peer routers 22-1-1-22-1-3. For example, the EBGP peer router 22-1-2 has an IP address of 1.2.3.4, and a first communications interface of the EBGP router 14-1 may have an IP address of 1.2.3.5. Similarly, the EBGP peer router 22-1-3 has an IP address of 1.3.2.4, and a second communications interface of the EBGP router 14-1 may have an IP address of 1.3.2.5, which is a different subnet than that of the first communications interface of the EBGP router 14-1.

The EBGP router 14-2, at the IEP 18-2, maintains an EBGP session with EBGP peer routers 22-2-1-22-2-4. Note that the EBGP peer router 22-2-1 has the same ASN as the EBGP peer router 22-1-2. In a large and geographically dispersed network, an AS may establish EBGP peer sessions with another AS at multiple different geographic locations. As discussed above, the EBGP router 14-2 has separate EBGP sessions with each of the EBGP peer routers 22-2-1-22-2-4, and is on a different subnet with each of the EBGP peer routers 22-2-1-22-2-4. The EBGP router 14-2 maintains configuration information, including peer information 24-2, that contains that same information about each EBGP peer router 22-2-1-22-1-4 as discussed above with regard to the peer information 24-1.

The EBGP router 14-3, at the IEP 18-3, maintains an EBGP session with hundreds of EBGP peer routers 22-3-1-22-3-N. In this example, a service provider operates the AS 12, and offers Internet connectivity to hundreds of customers. Each of the EBGP peer routers 22-3-1-22-3-N are operated by a different customer. The EBGP router 14-3 has separate EBGP sessions with each of the EBGP peer routers 22-3-1-22-3-N, and is on a different subnet with each of the EBGP peer routers 22-3-1-22-3-N. The EBGP router 14-3 maintains configuration information, including peer information 24-3, that contains that same information about each EBGP peer router 22-3-1-22-3-N as discussed above with regard to the peer information 24-1.

The EBGP router 14-4, at the IEP 18-4, maintains an EBGP session with EBGP peer routers 22-4-1-22-4-3. The EBGP router 14-4 has separate EBGP sessions with each of the EBGP peer routers 22-4-1-22-4-3, and is on a different subnet with each of the EBGP peer routers 22-4-1-22-4-3. The EBGP router 14-4 maintains configuration information, including peer information 24-4, that contains that same information about each EBGP peer router 22-4-1-22-4-3 as discussed above with regard to the peer information 24-1.

The environment 10 includes a computing device 34, which in turn includes a processor device 36 and a memory 38. The computing device 34 is communicatively coupled to the EBGP routers 14 and the routers 16. The memory 38 includes an EBGP peer analyzer 40, which periodically and/or intermittently obtains, from each of the EBGP routers 14, the peer information 24-1-24-4, respectively, that contains information about the EBGP peer routers 22 to which the respective EBGP routers 14 have EBGP sessions. The EBGP peer analyzer 40 may obtain this information at any desired time, or periodic interval, such as every second, every five seconds, every 30 seconds, every minute, every five minutes, or the like.

The EBGP peer analyzer 40 stores the peer information 24 obtained from the EBGP routers 14 in a peer information structure 42 for subsequent processing, as described in greater detail below. The EBGP peer analyzer 40 may obtain the peer information 24 in any desired manner. In one embodiment, the EBGP peer analyzer 40 may send a message to each of the EBGP routers 14 and request the peer information 24. In other embodiments, the EBGP routers 14 may be programmed or otherwise configured to send the peer information 24 to the EBGP peer analyzer 40 on a periodic or intermittent basis, or upon the occurrence of some event. In some embodiments, the peer information 24 may be sent as SNMP information that is provided by the EBGP routers 14 to the EBGP peer analyzer 40. In some embodiments, the EBGP routers 14 may provide telemetry information to the EBGP peer analyzer 40 that includes the peer information 24.

It is noted that, because the EBGP peer analyzer 40 is a component of the computing device 34, functionality implemented by the EBGP peer analyzer 40 may be attributed to the computing device 34 generally. Moreover, in examples where the EBGP peer analyzer 40 comprises software instructions that program the processor device 36 to carry out functionality discussed herein, functionality implemented by the EBGP peer analyzer 40 may be attributed herein to the processor device 36.

While the peer information 24 has been described as containing the IP address, the ASN, the description, and the active prefix count of each EBGP peer router 22, in other embodiments the peer information 24 may include other information that may be desired. An example of additional peer information 24 that may be obtained from the EBGP router 14-1 is illustrated in Table 1, below.

TABLE 1

```
"bgp-information" : [
  {
    "attributes" : {"xmlns" :
"http://xml.juniper.net/junos/19.2R0/junos-routing"},
    "bgp-peer" : [
      {
        "attributes" : {"junos:style" : "detail"},
        "peer-address" : [
          {
            "data" : "96.34.226.67+179"
          }
        ],
        "peer-as" : [
          {
            "data" : "65209"
          }
        ],
        "local-address" : [
          {
            "data" : "96.34.226.1+62485"
          }
        ],
        "local-as" : [
          {
            "data" : "65206"
          }
        ],
        "description" : [
          {
            "data" : "ENWECORZK1C-PCR02"
          }
        ],
        "peer-group" : [
          {
            "data" : "BG_ASN65209_4"
          }
        ],
        "peer-cfg-rti" : [
          {
            "data" : "master"
          }
        ],
        "peer-fwd-rti" : [
          {
            "data" : "master"
          }
        ],
        "peer-type" : [
          {
            "data" : "External"
          }
        ],
        "peer-state" : [
          {
            "data" : "Established"
          }
        ],
        "peer-flags" : [
          {
```

TABLE 1-continued

```
    "data" : "Sync RSync"
  }
],
"last-state" : [
  {
    "data" : "EstabSync"
  }
],
"last-event" : [
  {
    "data" : "RecvKeepAlive"
  }
],
"last-error" : [
  {
    "data" : "None"
  }
],
"bgp-rib" : [
  {
    "attributes" : {"junos:style" : "detail"},
    "name" : [
      {
        "data" : "inet.0"
      }
    ],
    "rib-bit" : [
      {
        "data" : "20001"
      }
    ],
    "bgp-rib-state" : [
      {
        "data" : "BGP restart is complete"
      }
    ],
    "send-state" : [
      {
        "data" : "in sync"
      }
    ],
    "active-prefix-count" : [
      {
        "data" : "25"
      }
    ],
    "received-prefix-count" : [
      {
        "data" : "26"
      }
    ],
    "accepted-prefix-count" : [
      {
        "data" : "26"
      }
    ],
    "suppressed-prefix-count" : [
      {
        "data" : "0"
      }
    ],
    "advertised-prefix-count" : [
      {
        "data" : "815919"
      }
    ]
  },
}
```

Figure 2:
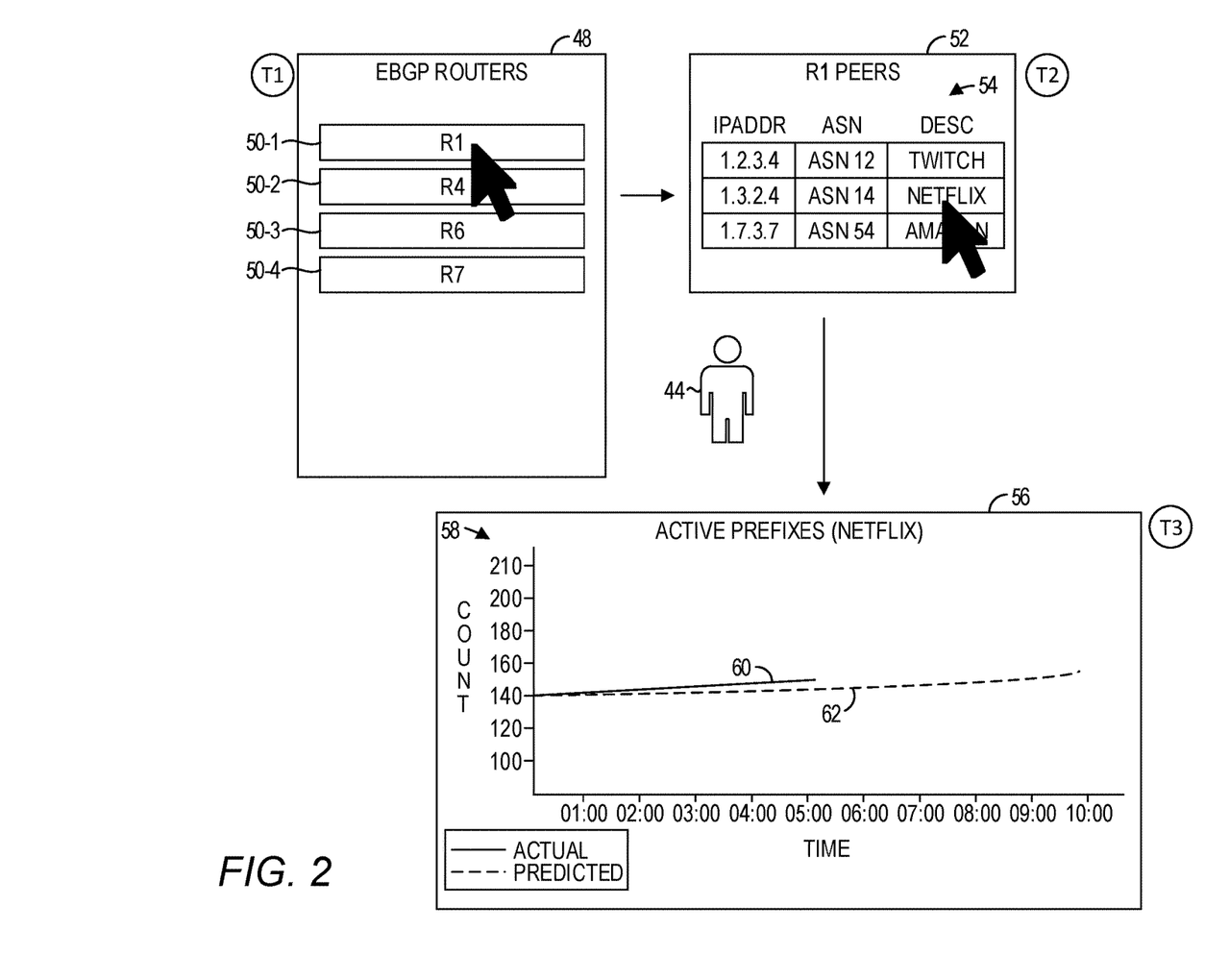
FIG. 2 is a diagram of a sequence of user interface imagery that an external border gateway protocol (EBGP) peer analyzer may present on a display device in response to inputs from an operator, according to one embodiment.

The EBGP peer analyzer 40 may, based at least in part on the peer information structure 42, present user face imagery on a display device 46 for an operator 44. In this regard, FIG. 2 is a diagram of a sequence of user interface imagery that the EBGP peer analyzer 40 may present on the display device 46 in response to inputs from the operator 44, according to one embodiment. In response to an input from the operator 44, the EBGP peer analyzer 40 accesses the peer information structure 42 and determines that the AS 12 includes four EBGP routers 14-1-14-4. The EBGP peer analyzer 40 generates user interface imagery 48 that includes a plurality of EBGP router controls 50-1-50-4, which correspond to the EBGP routers 14-1-14-4, respectively. At time T1 the EBGP peer analyzer 40 presents the user interface imagery 48 on the display device 46.

The operator 44, in this example, makes a router selection input by selecting the EBGP router control 50-1, such as by using a mouse, a keyboard, a touch sensitive surface, or the like. The EBGP peer analyzer 40 receives the router selection input, and accesses the peer information structure 42 to obtain information about the EBGP peer routers 22-1-1-22-1-3 of the EBGP router 14-1. The EBGP peer analyzer 40 generates user interface imagery 52 that comprises information 54 about the EBGP peer routers 22-1-1-22-1-3. In this example, the information 54 provides the IP address, the ASN, and the description of each of the EBGP peer routers 22-1-1-22-1-3. At time T2 the EBGP peer analyzer 40 presents the user interface imagery 52 on the display device 46.

The operator 44, in this example, makes an EBGP peer selection input that selects the EBGP peer router 22-1-3, such as by clicking on information about the EBGP peer router 22-1-3, selecting a radio button or checkbox (not illustrated), or the like. The EBGP peer analyzer 40 receives the EBGP peer selection input, and in response, generates user interface imagery 56 that depicts an active prefixes graph 58. A Y-axis of the active prefixes graph 58 is a count of active prefixes, and an X-axis of the active prefixes graph 58 is time. In this example, the time is in terms of an amount of time since the origination of the EBGP peer session between the EBGP router 14-1 and the EBGP peer router 22-1-3. In this embodiment, the active prefixes graph 58 includes an actual active prefixes line 60 that identifies a value of an active prefixes counter that identifies a number of active prefixes associated with the EBGP peer router 22-1-3 at various instances in time since the beginning of the EBGP peer session between the EBGP router 14-1 and the EBGP peer router 22-1-3. The active prefixes graph 58 also includes a predicted active prefixes line 62 that identifies a predicted value of active prefixes associated with the EBGP peer router 22-1-3 at various instances in time since the beginning of the EBGP peer session. The predicted active prefixes line 62 also identifies a predicted value of active prefixes associated with the EBGP peer router 22-1-3 at various times in the future. At time T3, the EBGP peer analyzer 40 presents the user interface imagery 56 on the display device 46.

As will be discussed in greater detail herein, the predicted active prefixes line 62 is generated by a machine-learned model (MLM) that is trained, on an on-going basis, with actual active prefix counts of the EBGP peer router 22-1-3. Significant disparities between the predicted active prefixes line 62 and the actual active prefixes line 60 can be an indicator of a prefix announcement problem with the EBGP peer router 22-1-3, which may be a pre-cursor to outages and/or other problems.

Figure 3:
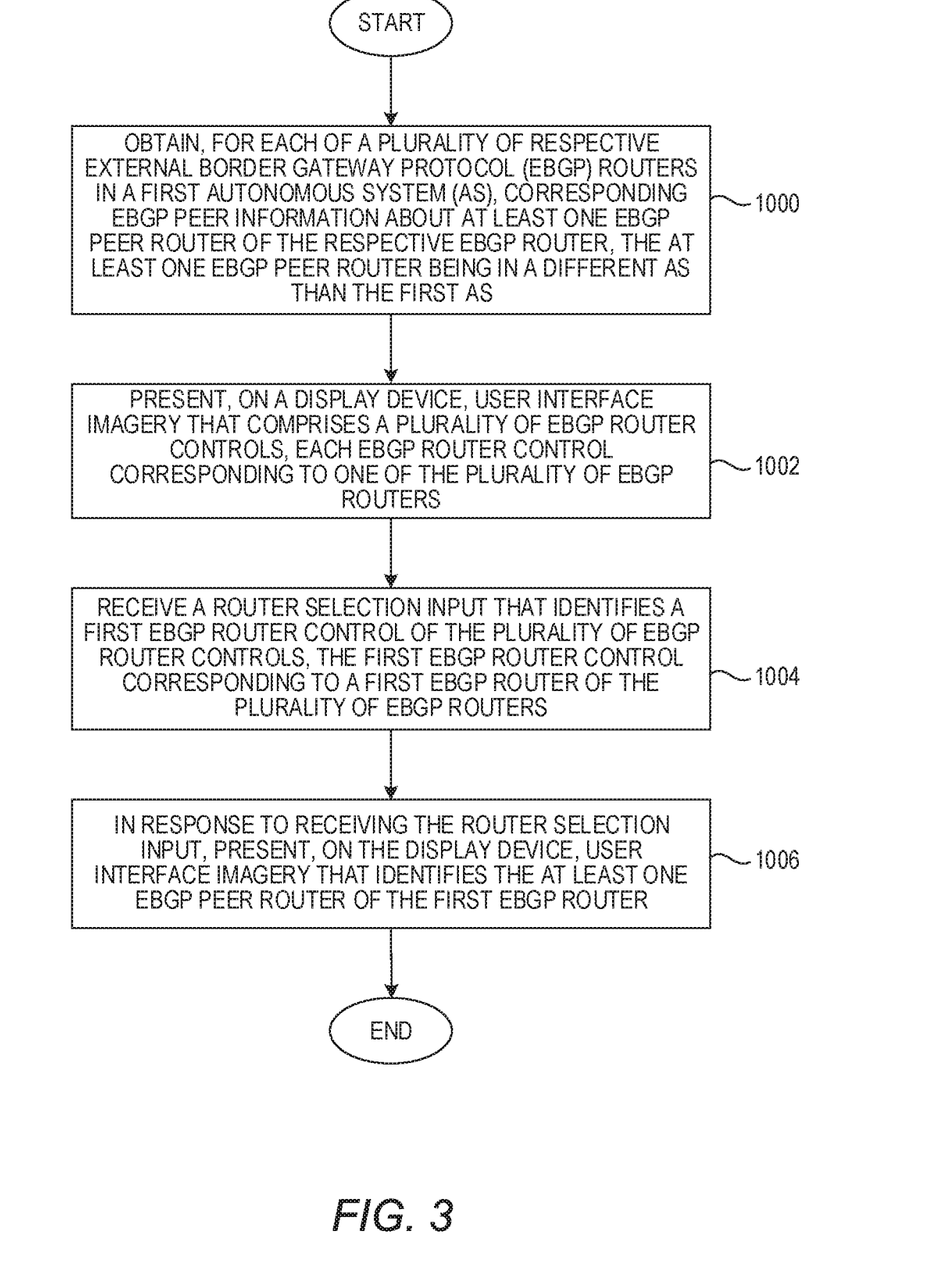
FIG. 3 is a flowchart of a method for EBGP peer analysis according to one embodiment.

FIG. 3 is a flowchart of a method for external border gateway protocol peer analysis according to one embodiment. FIG. 3 will be discussed in conjunction with FIGS. 1 and 2. The computing device 34 obtains, for a plurality of respective EBGP router 14-1-14-4 in the AS 12, corresponding EBGP peer information 24-1-24-4 about at least one EBGP peer router 22 of the respective EBGP router 14-1-14-4, the EBGP peer router 22 being in a different AS than the AS 12 (FIG. 3, block 1000). The computing device 34 presents, on the display device 46, the user interface imagery 48 that comprises the plurality of EBGP router controls 50-1-50-2, each EBGP router control 50-1-50-2 corresponding to one of the plurality of EBGP routers 14-1-14-4 (FIG. 3, block 1002). The computing device 34 receives a router selection input that identifies the EBGP router control 50-1 of the plurality of EBGP router controls 50-1-50-2, the EBGP router control 50-1 corresponding to the EBGP router 14-1 of the plurality of EBGP routers 14-1-14-4 (FIG. 3, block 1004). The computing device 34, in response to receiving the router selection input, presents, on the display device 46, the user interface imagery 52 that identifies the EBGP peer routers 22-1-1-22-1-3 of the EBGP router 14-1 (FIG. 3, block 1006).

Figure 4:
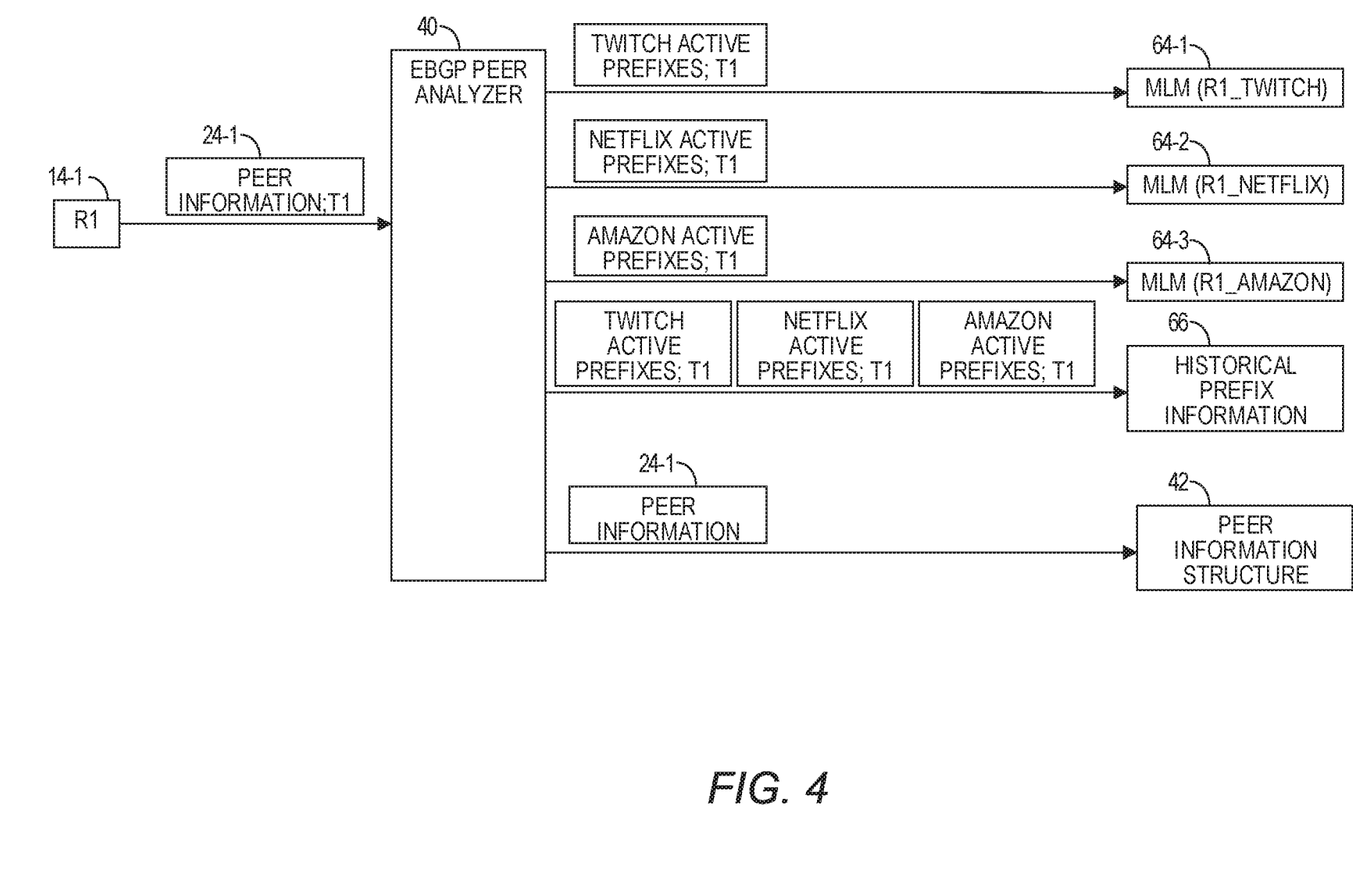
FIG. 4 is a block diagram illustrating an ongoing training sequence for training a machine-learned model according to one embodiment.

FIG. 4 is a block diagram illustrating an ongoing training sequence for training a machine-learned model according to one embodiment. The EBGP peer analyzer 40 obtains peer information 24-1 from the EBGP router 14-1 periodically or intermittently, as discussed above. The peer information 24-1 includes, for example, for each EBGP peer router 22-1-1-22-1-3 with which the EBGP router 14-1 has an EBGP session, the IP address of the EBGP peer router 22-1-1-22-1-3, the ASN of the EBGP peer router 22-1-1-22-1-3, the description of the EBGP peer router 22-1-1-22-1-3, and the current active prefix count of the EBGP peer router 22-1-1-22-1-3. The EBGP peer analyzer 40 receives the peer information 24-1 and extracts, for each identified EBGP peer router 22-1-1-22-1-3, the active prefix count. The EBGP peer analyzer 40 then provides the active prefix count and a timestamp to a corresponding MLM 64-1-64-3. In this example, the EBGP peer analyzer 40 provides the active prefix count of the EBGP peer router 22-1-1 and a timestamp to the corresponding MLM 64-1; the EBGP peer analyzer 40 provides the active prefix count of the EBGP peer router 22-1-2 and a timestamp to the corresponding MLM 64-2; and the EBGP peer analyzer 40 provides the active prefix count of the EBGP peer router 22-1-3 and a timestamp to the corresponding MLM 64-3.

The MLMs 64-1-64-3 may comprise any type of machine-learned model that is suitable for being trained to predict a number of prefixes over time. In some embodiments, the MLMs 64-1-64-3 may comprise a supervised MLM that uses a regression algorithm.

The EBGP peer analyzer 40 also stores the active prefix counts of each EBGP peer router 22-1-1-22-1-3 and a timestamp in a historical prefix information structure 66. The EBGP peer analyzer 40 updates the peer information structure 42 with the peer information 24-1.

Figure 5:
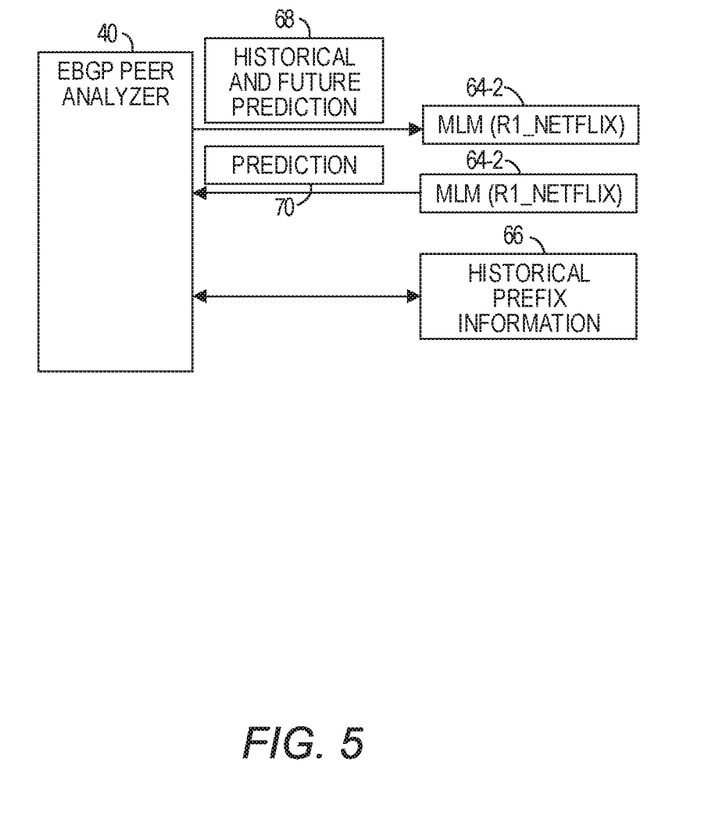
FIG. 5 is a block diagram illustrating the generation of an active prefixes graph according to one embodiment.

FIG. 5 is a block diagram illustrating the generation of an active prefixes graph according to one embodiment. FIG. 5 will be discussed in conjunction with FIG. 4. In this example, assume, as illustrated in FIG. 4, that the operator 44 selects, from the user interface imagery 52 the EBGP peer router 22-1-3, such as by clicking on information about the EBGP peer router 22-1-3. The EBGP peer analyzer 40 receives the EBGP peer selection input, and in response, sends a request 68 to the MLM 64-2 for a predicted values of active prefixes associated with the EBGP peer router 22-1-3 at various instances in time since the beginning of the EBGP peer session and for a period of time in the future. The MLM 64-2 responds with predicted values 70. The EBGP peer analyzer 40 generates the predicted active prefixes line 62 based on the predicted values 70. The EBGP peer analyzer 40 accesses the historical prefix information structure 66 and obtains the values of active prefixes associated with the EBGP peer router 22-1-3 at various instances in time since the beginning of the EBGP peer session between the EBGP router 14-1 and the EBGP peer router 22-1-3. The EBGP peer analyzer 40 generates the actual active prefixes line 60 based on this historical data.

Figure 6:
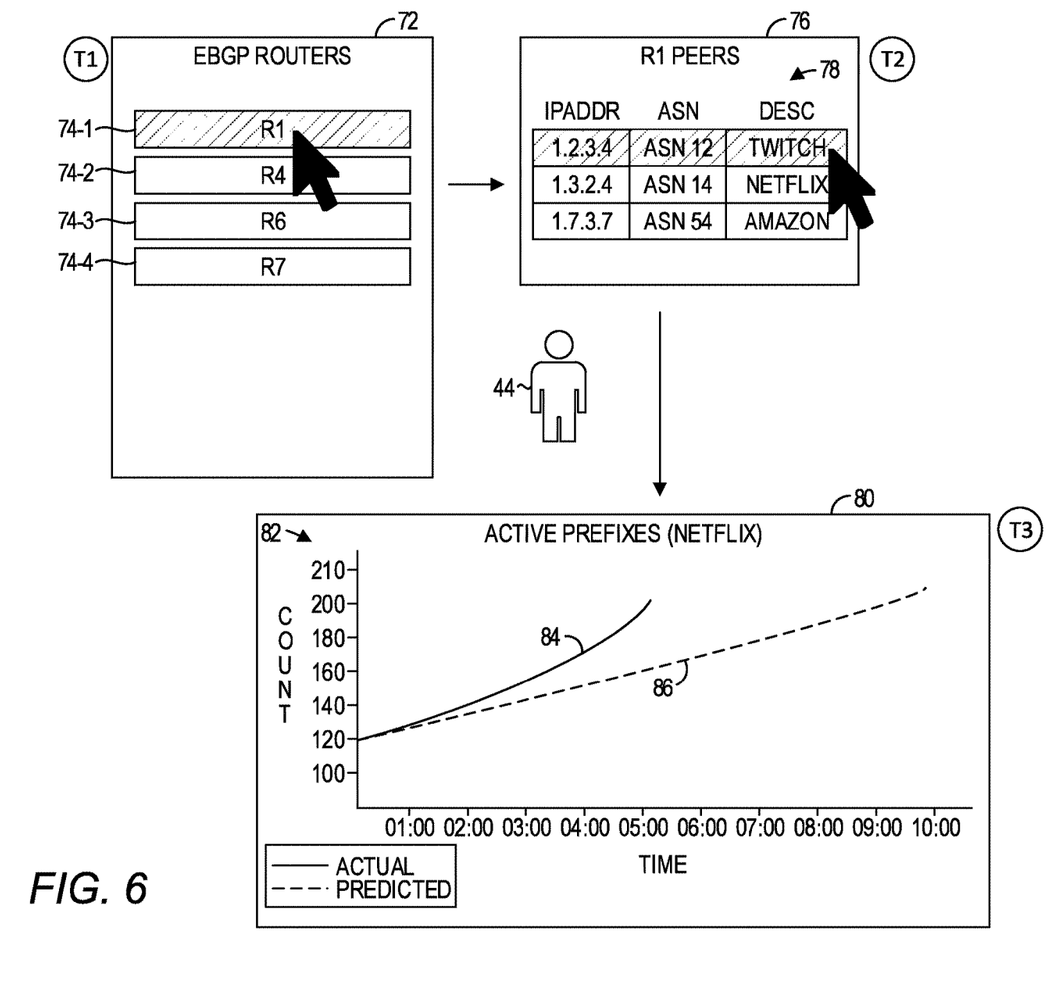
FIG. 6 is a diagram of a sequence of user interface imagery that an EBGP peer analyzer may present on a display device in response to inputs from an operator, according to another embodiment.

FIG. 6 is a diagram of a sequence of user interface imagery that the EBGP peer analyzer 40 may present on the display device 46 in response to inputs from the operator 44, according to another embodiment. In response to an input from the operator 44, the EBGP peer analyzer 40 accesses the peer information structure 42 and determines that the AS 12 includes four EBGP routers 14-1-14-4. The EBGP peer analyzer 40 generates user interface imagery 72 that includes a plurality of EBGP router controls 74-1-74-4, which correspond to the EBGP routers 14-1-14-4, respectively. The EBGP peer analyzer 40 also sends, to each MLM associated with each of the EBGP peer routers 22, a request for predicted values of active prefixes associated with the respective EBGP peer router 22 at various instances in time since the beginning of the corresponding EBGP peer session. The EBGP peer analyzer 40 accesses the historical prefix information structure 66 and obtains the values of active prefixes associated with each EBGP peer router 22 at various instances in time since the beginning of the corresponding EBGP peer session. The EBGP peer analyzer 40 analyzes the predicted values of active prefixes and the actual values of active prefixes for each EBGP peer router 22 to determine whether the actual values and the predicted values have deviated from one another beyond some predetermined threshold.

In this example, the EBGP peer analyzer 40 determines that the actual values and the predicted values associated with the EBGP peer router 22-1-2 have deviated beyond the predetermined threshold. In response, the EBGP peer analyzer 40 alters a visual characteristic of the EBGP router control 74-1 to make the EBGP router control 74-1 visually distinct and different from the EBGP router controls 74-2-74-4, such as by altering a background color of the EBGP router control 74-1, bolding the text of the EBGP router control 74-1, adding an additional icon such as an alert symbol to the EBGP router control 74-1, or the like. At time T1 the EBGP peer analyzer 40 presents the user interface imagery 72 on the display device 46.

The operator 44, observing that the EBGP router control 74-1 contains the distinguishing visual characteristic, makes a router selection input by selecting the EBGP router control 74-1. The EBGP peer analyzer 40 receives the router selection input, and accesses the peer information structure 42 to obtain information about the EBGP peer routers 22-1-1-22-1-3 of the EBGP router 14-1. The EBGP peer analyzer 40 generates user interface imagery 76 that comprises information 78 about the EBGP peer routers 22-1-1-22-1-3. The EBGP peer analyzer 40 also alters a visual characteristic of the information 78 that pertains to the EBGP peer router 22-1-2 to make such information visually distinct and different from the information 78 that pertains to the EBGP peer routers 22-1-1 and 22-1-3. At time T2 the EBGP peer analyzer 40 presents the user interface imagery 76 on the display device 46.

The operator 44, observing that the information 78 that pertains to the EBGP peer router 22-1-2 contains the distinguishing visual characteristic, makes an EBGP peer selection input that selects the EBGP peer router 22-1-2. The EBGP peer analyzer 40 receives the EBGP peer selection input, and in response, generates user interface imagery 80 that depicts an active prefixes graph 82. In this example, the active prefixes graph 82 includes an actual active prefixes line 84 that identifies a value of an active prefixes counter that identifies a number of active prefixes associated with the EBGP peer router 22-1-2 at various instances in time since the beginning of the EBGP peer session between the EBGP router 14-1 and the EBGP peer router 22-1-2. The active prefixes graph 82 also includes a predicted active prefixes line 86 that identifies a predicted value of active prefixes associated with the EBGP peer router 22-1-2 at various instances in time since the beginning of the EBGP peer session. The predicted active prefixes line 62 also identifies a predicted value of active prefixes associated with the EBGP peer router 22-1-2 at various times in the future. At time T3 the EBGP peer analyzer 40 presents the user interface imagery 80 on the display device 46. The operator 44 observes a wide discrepancy between the actual prefix count and the predicted prefix count and determines that there is likely a problem with the EBGP peer router 22-1-2. For instance, the EBGP peer router 22-1-2 may be undergoing a hijack attack and announcing a large quantity of prefixes that the EBGP peer router 22-1-2 does not own, or the like. The operator 44 may initiate an action, such as disconnecting the EBGP peer router 22-1-2, to halt the flood of prefixes.

Figure 7:
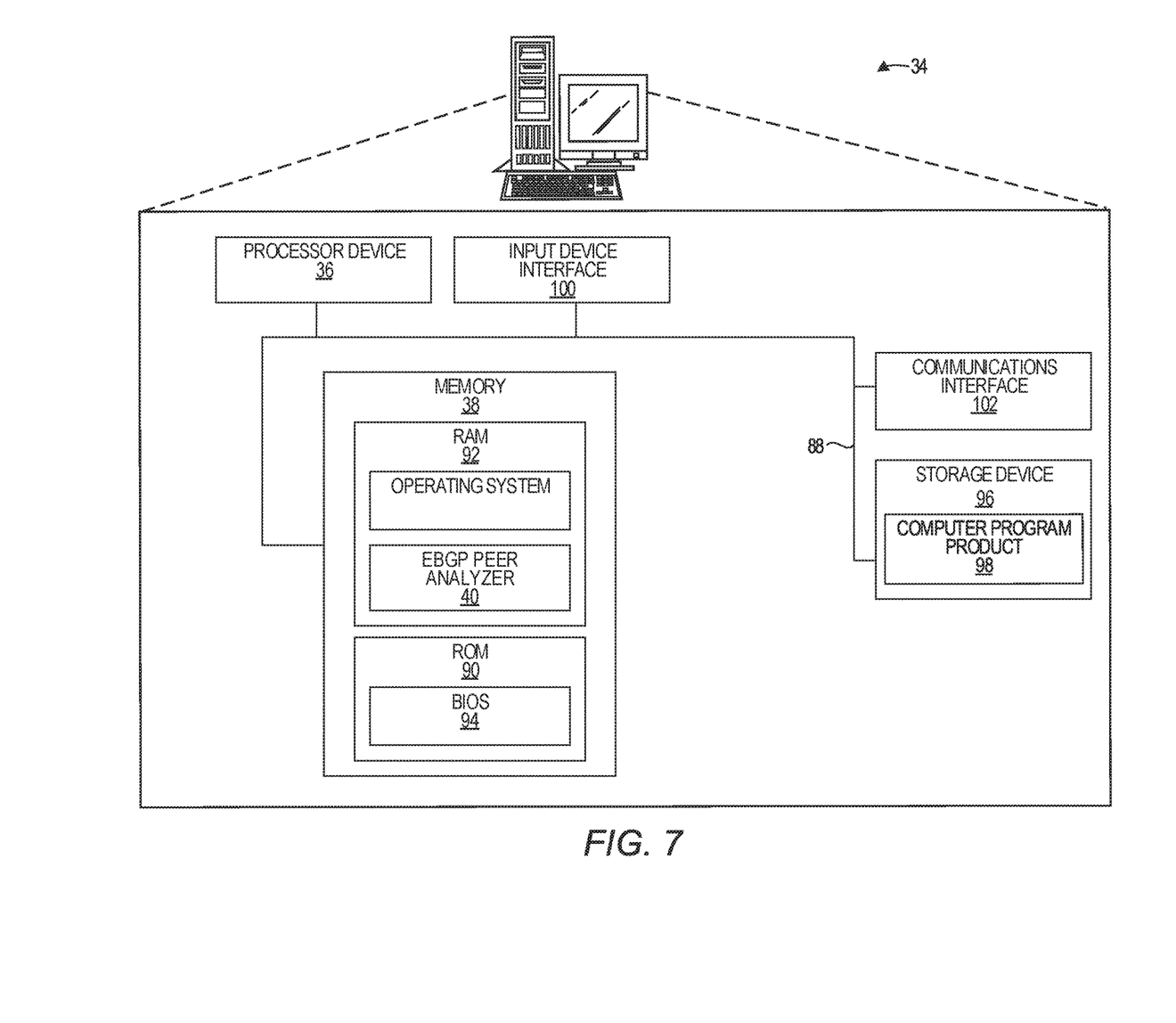
FIG. 7 is a block diagram of a computing device suitable for implementing the embodiments.

FIG. 7 is a block diagram of the computing device 34 suitable for implementing examples according to one example. The computing device 34 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 34 includes the processor device 36, the memory 38, and a system bus 88. The system bus 88 provides an interface for system components including, but not limited to, the memory 38 and the processor device 36. The processor device 36 can be any commercially available or proprietary processor, such as an Intel®, AMD®, IBM® processor device or the like.

The system bus 88 may be any of several types of bus structures that may further interconnect to a memory bus (with or without a memory controller), a peripheral bus, and/or a local bus using any of a variety of commercially available bus architectures. The memory 38 may include non-volatile memory 90 (e.g., read-only memory (ROM), erasable programmable read-only memory (EPROM), electrically erasable programmable read-only memory (EEPROM), etc.), and volatile memory 92 (e.g., random-access memory (RAM)). A basic input/output system (BIOS) 94 may be stored in the non-volatile memory 90 and can include the basic routines that help to transfer information between elements within the computing device 34. The volatile memory 92 may also include a high-speed RAM, such as static RAM, for caching data.

The computing device 34 may further include or be coupled to a non-transitory computer-readable storage medium such as a storage device 96, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 96 and other drives associated with computer-readable media and computer-usable media may provide non-volatile storage of data, data structures, computer-executable instructions, and the like.

A number of modules can be stored in the storage device 96 and in the volatile memory 92, including an operating system and one or more program modules, such as the EBGP peer analyzer 40, which may implement the functionality described herein in whole or in part.

All or a portion of the examples may be implemented as a computer program product 98 stored on a transitory or non-transitory computer-usable or computer-readable storage medium, such as the storage device 96, which includes complex programming instructions, such as complex computer-readable program code, to cause the processor device 36 to carry out the steps described herein. Thus, the computer-readable program code can comprise software instructions for implementing the functionality of the examples described herein when executed on the processor device 36. The processor device 36, in conjunction with the EBGP peer analyzer 40 in the volatile memory 92, may serve as a controller, or control system, for the computing device 34 that is to implement the functionality described herein.

The operator 44 may also be able to enter one or more configuration commands through a keyboard (not illustrated), a pointing device such as a mouse (not illustrated), or a touch-sensitive surface such as the display device 46. Such input devices may be connected to the processor device 36 through an input device interface 100 that is coupled to the system bus 88 but can be connected by other interfaces such as a parallel port, an Institute of Electrical and Electronic Engineers (IEEE) 1394 serial port, a Universal Serial Bus (USB) port, an IR interface, and the like. The computing device 34 may also include a communications interface 102 suitable for communicating with the components, such as the EBGP routers 14 and the routers 16 as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    obtaining, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS;
    presenting, on a display device, user interface imagery that comprises a plurality of EBGP router controls, each EBGP router control corresponding to one of the plurality of EBGP routers and being user-selectable;
    receiving a router selection input that identifies a first EBGP router control of the plurality of EBGP router controls, the first EBGP router control corresponding to a first EBGP router of the plurality of EBGP routers; and
    in response to receiving the router selection input, presenting, on the display device, user interface imagery that identifies the at least one EBGP peer router of the first EBGP router and includes one or more of an internet protocol address of the at least one EBGP peer router, an autonomous system number assigned to the at least one EBGP peer router, and a textual description associated with the at least one EBGP peer router.

2. The method of claim 1 further comprising:
    receiving an EBGP peer selection input that identifies the at least one EBGP peer router; and
    in response to receiving the EBGP peer selection input, presenting user interface imagery that depicts an active prefix graph that comprises an actual active prefixes line that identifies a number of active prefixes associated with the at least one EBGP peer router at each of a plurality of times over a period of time and comprises a predicted active prefixes line that identifies a predicted value of active prefixes associated with the at least one EBGP peer router at the plurality of times over the period of time.

3. The method of claim 2 wherein the predicted active prefixes line further identifies a predicted value of active prefixes associated with the at least one EBGP peer router for a future period of time.

4. The method of claim 1 wherein the at least one EBGP peer router comprises a plurality of EBGP peer routers, and wherein the user interface imagery that identifies the at least one EBGP peer router of the router that corresponds to the first EBGP router control identifies the plurality of EBGP peer routers.

5. The method of claim 1 further comprising:
iteratively:
obtaining, from the first EBGP router, an active prefixes count that identifies a number of active prefixes associated with the at least one EBGP peer router; and
providing the active prefixes count to a machine-learned model that corresponds to the at least one EBGP peer router.

6. The method of claim 1 further comprising:
iteratively, for each respective EBGP router of the plurality of EBGP routers:
obtaining an active prefixes count that identifies a number of active prefixes associated with at least one EBGP peer router of the respective EBGP router; and
providing the active prefixes count to a machine-learned model that corresponds to the at least one EBGP peer router of the respective EBGP router.

7. The method of claim 1 further comprising:
determining that the at least one EBGP peer router of the first EBGP router has an actual active prefix count that differs from a predicted active prefix count beyond a predetermined threshold; and
altering a visual characteristic of the first EBGP router control that corresponds to the first EBGP router to make the first EBGP router control visually distinct from the other EBGP router controls.

8. A computing device, comprising:
a memory; and
a processor device coupled to the memory to:
obtain, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS;
present, on a display device, user interface imagery that comprises a plurality of EBGP router controls, each EBGP router control corresponding to one of the plurality of EBGP routers and being user-selectable;
receive a router selection input that identifies a first EBGP router control of the plurality of EBGP router controls, the first EBGP router control corresponding to a first EBGP router of the plurality of EBGP routers; and
in response to receiving the router selection input, present, on the display device, user interface imagery that identifies the at least one EBGP peer router of the first EBGP router and includes one or more of an internet protocol address of the at least one EBGP peer router, an autonomous system number assigned to the at least one EBGP peer router, and a textual description associated with the at least one EBGP peer router.

9. The computing device of claim 8 wherein the processor device is further configured to:
receive an EBGP peer selection input that identifies the at least one EBGP peer router; and
in response to receiving the EBGP peer selection input, present user interface imagery that depicts an active prefix graph that comprises an actual active prefixes line that identifies a number of active prefixes associated with the at least one EBGP peer router at each of a plurality of times over a period of time and comprises a predicted active prefixes line that identifies a predicted value of active prefixes associated with the at least one EBGP peer router at the plurality of times over the period of time.

10. The computing device of claim 9 wherein the predicted active prefixes line further identifies a predicted value of active prefixes associated with the at least one EBGP peer router for a future period of time.

11. The computing device of claim 8 wherein the at least one EBGP peer router comprises a plurality of EBGP peer routers, and wherein the user interface imagery that identifies the at least one EBGP peer router of the router that corresponds to the first EBGP router control identifies the plurality of EBGP peer routers.

12. The computing device of claim 8 wherein the processor device is further configured to:
iteratively:
obtain, from the first EBGP router, an active prefixes count that identifies a number of active prefixes associated with the at least one EBGP peer router; and
provide the active prefixes count to a machine-learned model that corresponds to the at least one EBGP peer router.

13. A non-transitory computer-readable storage medium that includes executable instructions configured to cause a processor device to:
obtain, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS;
present, on a display device, user interface imagery that comprises a plurality of EBGP router controls, each EBGP router control corresponding to one of the plurality of EBGP routers and being user-selectable;
receive a router selection input that identifies a first EBGP router control of the plurality of EBGP router controls, the first EBGP router control corresponding to a first EBGP router of the plurality of EBGP routers; and
in response to receiving the router selection input, present, on the display device, user interface imagery that identifies the at least one EBGP peer router of the first EBGP router and includes one or more of an internet protocol address of the at least one EBGP peer router, an autonomous system number assigned to the at least one EBGP peer router, and a textual description associated with the at least one EBGP peer router.

14. The non-transitory computer-readable storage medium of claim 13 wherein the instructions are further configured to cause the processor device to:
receive an EBGP peer selection input that identifies the at least one EBGP peer router;
in response to receiving the EBGP peer input, present user interface imagery that depicts an active prefix graph that comprises an actual active prefixes line that identifies a number of active prefixes associated with the at least one EBGP peer router at each of a plurality of times over a period of time and comprises a predicted active prefixes line that identifies a predicted value of active prefixes associated with the at least one EBGP peer router at the plurality of times over the period of time.

15. The non-transitory computer-readable storage medium of claim 14 wherein the predicted active prefixes line further identifies a predicted value of active prefixes associated with the at least one EBGP peer router for a future period of time.

16. The non-transitory computer-readable storage medium of claim 13 wherein the at least one EBGP peer router comprises a plurality of EBGP peer routers, and wherein the user interface imagery that identifies the at least one EBGP peer router of the router that corresponds to the first EBGP router control identifies the plurality of EBGP peer routers.

17. The non-transitory computer-readable storage medium of claim 13 wherein the instructions are further configured to cause the processor device to:
iteratively:
obtain, from the first EBGP router, an active prefixes count that identifies a number of active prefixes associated with the at least one EBGP peer router; and
provide the active prefixes count to a machine-learned model that corresponds to the at least one EBGP peer router.

18. A method comprising:
obtaining, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS;
presenting, on a display device, user interface imagery that comprises a plurality of EBGP router controls, each EBGP router control corresponding to one of the plurality of EBGP routers and being user-selectable;
receiving a router selection input that identifies a first EBGP router control of the plurality of EBGP router controls, the first EBGP router control corresponding to a first EBGP router of the plurality of EBGP routers; and
in response to receiving the router selection input, presenting, on the display device, user interface imagery that identifies the at least one EBGP peer router of the first EBGP router, wherein the at least one EBGP peer router comprises a plurality of EBGP peer routers, and wherein the user interface imagery that identifies the at least one EBGP peer router of the router that corresponds to the first EBGP router control identifies the plurality of EBGP peer routers.

19. A method comprising:
obtaining, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS;
determining that at least one EBGP peer router of a first EBGP router of the plurality of EBGP routers has an actual active prefix count that differs from a predicted active prefix count beyond a predetermined threshold;
presenting, on a display device, user interface imagery that comprises a plurality of EBGP router controls, each EBGP router control corresponding to one of the plurality of EBGP routers and being user-selectable, and altering a visual characteristic of a first EBGP router control that corresponds to the first EBGP router to make the first EBGP router control visually distinct from the other EBGP router controls;
receiving a router selection input that identifies the first EBGP router control; and
in response to receiving the router selection input, presenting, on the display device, user interface imagery that identifies the at least one EBGP peer router of the first EBGP router.

20. A computing device, comprising:
a memory; and
a processor device coupled to the memory to:
obtain, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS;
present, on a display device, user interface imagery that comprises a plurality of EBGP router controls, each EBGP router control corresponding to one of the plurality of EBGP routers and being user-selectable;
receive a router selection input that identifies a first EBGP router control of the plurality of EBGP router controls, the first EBGP router control corresponding to a first EBGP router of the plurality of EBGP routers; and
in response to receiving the router selection input, present, on the display device, user interface imagery that identifies the at least one EBGP peer router of the first EBGP router, wherein the at least one EBGP peer router comprises a plurality of EBGP peer routers, and wherein the user interface imagery that identifies the at least one EBGP peer router of the router that corresponds to the first EBGP router control identifies the plurality of EBGP peer routers.

21. A computing device, comprising:
a memory; and
a processor device coupled to the memory to:
obtain, for each of a plurality of respective external border gateway protocol (EBGP) routers in a first autonomous system (AS), corresponding EBGP peer information about at least one EBGP peer router of the respective EBGP router, the at least one EBGP peer router being in a different AS than the first AS;
determine that at least one EBGP peer router of a first EBGP router of the plurality of EBGP routers has an actual active prefix count that differs from a predicted active prefix count beyond a predetermined threshold;
present, on a display device, user interface imagery that comprises a plurality of EBGP router controls, each EBGP router control corresponding to one of the plurality of EBGP routers and being user-selectable, and alter a visual characteristic of a first EBGP router control that corresponds to the first EBGP router to make the first EBGP router control visually distinct from the other EBGP router controls;
receive a router selection input that identifies a first EBGP router control; and
in response to receiving the router selection input, present, on the display device, user interface imagery that identifies the at least one EBGP peer router of the first EBGP router.

* * * * *